(12) United States Patent
Kawakami

(10) Patent No.: US 8,614,761 B2
(45) Date of Patent: Dec. 24, 2013

(54) IMAGE CAPTURING APPARATUS THAT RECORDS CAPTURED IMAGE AND LOCATION INFORMATION IN ASSOCIATION WITH EACH OTHER

(75) Inventor: Gou Kawakami, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/252,417

(22) Filed: Oct. 4, 2011

(65) Prior Publication Data

US 2012/0081574 A1  Apr. 5, 2012

(30) Foreign Application Priority Data

Oct. 5, 2010 (JP) ................................. 2010-225546

(51) Int. Cl.
  H04N 5/222 (2006.01)
  H04N 5/76 (2006.01)
  H04N 5/225 (2006.01)
(52) U.S. Cl.
  USPC ................ 348/333.02; 348/231.2; 348/231.3; 348/207.2; 348/231.5
(58) Field of Classification Search
  USPC ........ 348/211.2, 231.2, 231.5, 241, 552, 598, 348/231.3, 242, 333.02, 207.2; 714/798; 707/736
  See application file for complete search history.

(56) References Cited

U.S. PATENT DOCUMENTS

| 6,526,352 | B1 * | 2/2003 | Johnson et al. | 701/470 |
| 7,822,746 | B2 * | 10/2010 | Svendsen | 707/736 |
| 8,275,649 | B2 * | 9/2012 | Zheng et al. | 705/7.34 |
| 2001/0010549 | A1 * | 8/2001 | Miyake | 348/232 |
| 2002/0161521 | A1 * | 10/2002 | Abe et al. | 701/213 |
| 2006/0156209 | A1 * | 7/2006 | Matsuura et al. | 714/798 |
| 2009/0189811 | A1 * | 7/2009 | Tysowski et al. | 342/357.15 |
| 2011/0141312 | A1 * | 6/2011 | Heminghous et al. | 348/231.5 |

FOREIGN PATENT DOCUMENTS

JP          5-224290 A       9/1993
WO    WO 2010029347 A1 *   3/2010   ............... G01S 5/00

* cited by examiner

Primary Examiner — Nhan T Tran
Assistant Examiner — Xi Wang
(74) Attorney, Agent, or Firm — Holtz, Holtz, Goodman & Chick, PC

(57) ABSTRACT

An image capturing apparatus including a location information acquiring unit 31, an image capturing unit 13, a storage control unit 32, a predictable location calculation unit 37 that predicts, in a case of failure to acquire location information at a time of image capturing, a range of locations predictable at the time of image capturing based on the location information acquired earlier than the time of image capturing, a display control unit 33 that displays a predictable range of locations on a display unit based on the acquired earlier location information and the range of locations thus predicted, a designation reception unit 34 that receives a location designated by a user from within the predictable range of locations, and a captured location setting unit 38 that sets location information of the received location as the location information at the time of image capturing.

9 Claims, 5 Drawing Sheets

FIG. 3

| USER'S MOVEMENT STATE | | DETECTION CONDITIONS |
|---|---|---|
| #1 | STATIONARY | NO COMPONENT WAS DETECTED IN EACH DIRECTION OF ACCELERATION BY TRIAXIAL ACCELERATION SENSOR (AMPLITUDE OF COMPONENT IN EACH DIRECTION IS BELOW 0.5G) |
| #2 | WALKING | TRIAXIAL ACCELERATION SENSOR DETECTED VERTICAL COMPONENT VIBRATION OF ACCELERATION HAVING FREQUENCY LESS THAN OR EQUAL TO 2Hz AND AMPLITUDE GREATER THAN OR EQUAL TO A PREDETERMINED VALUE 1.0G |
| #3 | RUNNING | TRIAXIAL ACCELERATION SENSOR DETECTED VERTICAL COMPONENT VIBRATION OF ACCELERATION HAVING FREQUENCY EXCEEDING 2Hz AND AMPLITUDE GREATER THAN OR EQUAL TO A PREDETERMINED VALUE 1.0G |
| #4 | MOVING ON A VEHICLE | TRIAXIAL ACCELERATION SENSOR DETECTED VERTICAL COMPONENT VIBRATION OF ACCELERATION HAVING AMPLITUDE BELOW A PREDETERMINED VALUE 0.5G AND ADVANCING COMPONENT VIBRATION OF ACCELERATION HAVING AMPLITUDE GREATER THAN OR EQUAL TO A PREDETERMINED VALUE 0.5G |

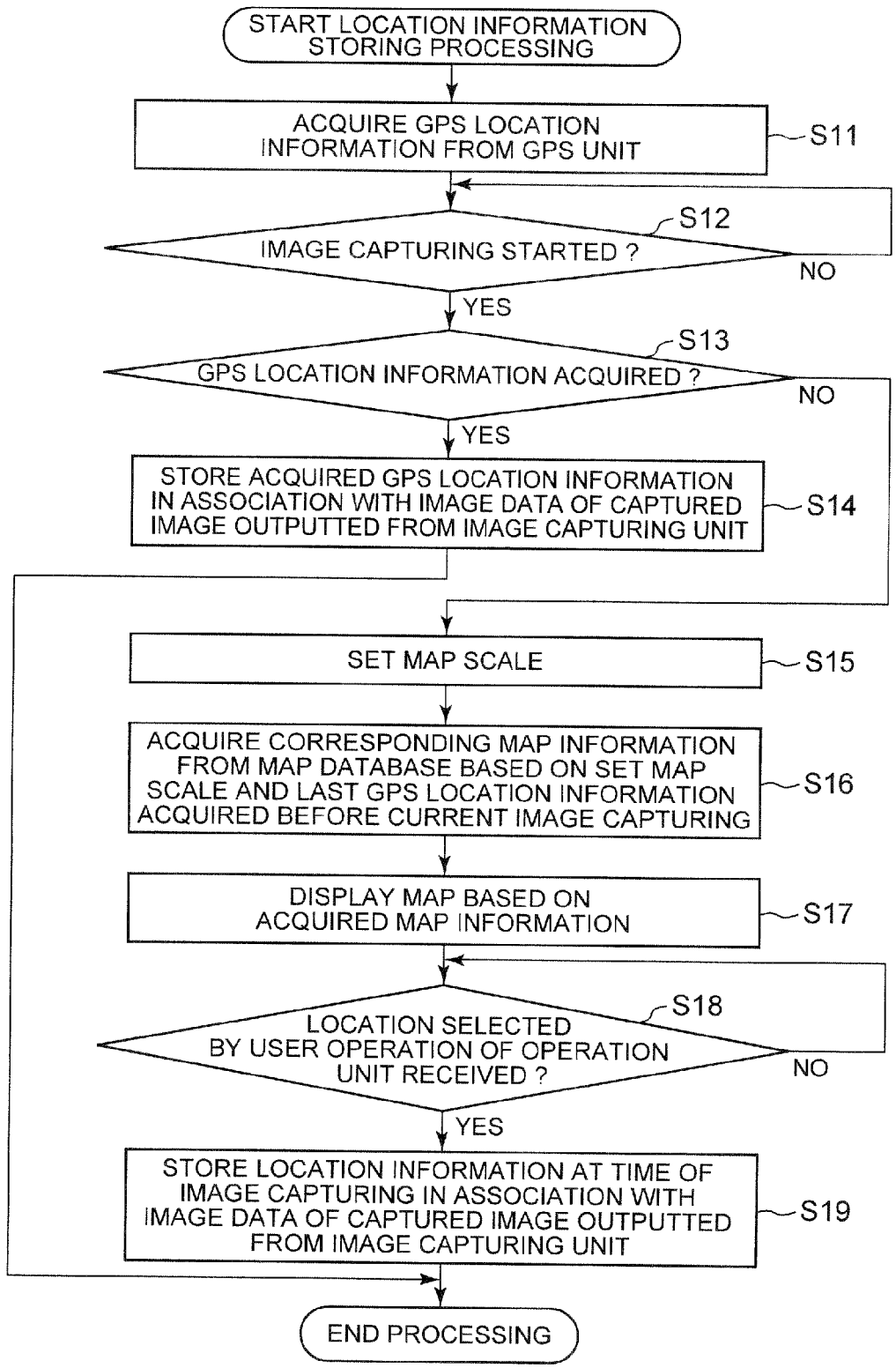

IMAGE CAPTURING APPARATUS THAT RECORDS CAPTURED IMAGE AND LOCATION INFORMATION IN ASSOCIATION WITH EACH OTHER

This application is based on and claims the benefit of priority from Japanese Patent Application No. 2010-225546, filed on 5 Oct. 2010, the content of which is incorporated herein by reference.

BACKGROUND OF THE INVENTION

1. Field of the Invention

The present invention relates to an image capturing apparatus, method, and storage medium, capable of realizing processing in which, when location information cannot be acquired by GPS, a location is designated by a simple operation by a user, location information thereof is acquired, and the location information is stored along with image data at the time of image capturing.

2. Related Art

Conventionally, a function (hereinafter, referred to as "GPS function") that acquires location information of a current location based on GPS signals from GPS (Global Positioning System) satellites has been installed mainly in dedicated navigation devices.

In recent years, however, due to significant advances in information processing technology, there have appeared digital cameras equipped with the GPS function.

For example, Japanese Patent Application Publication No. 1993-224290 discloses a technique in which a digital camera that stores, in a storage medium, captured image data along with location information acquired by means of the GPS function at the time of image capturing.

SUMMARY OF THE INVENTION

The present invention aims at realizing processing in which, when location information cannot be acquired by GPS, a location is designated by a simple operation by a user, location information thereof is acquired, and the location information is stored along with image data at the time the image is captured. In order to attain the above-described object, in accordance with a first aspect of the present invention, there is provided an image capturing apparatus, including:

a location information acquiring unit that measures a current location and acquires location information;

an image capturing unit that captures an image of a subject and outputs image data acquired as a result thereof;

a storage control unit that stores the location information acquired by the location information acquiring unit at a time of image capturing by the image capturing unit, in association with the image data outputted from the image capturing unit;

a location prediction unit that predicts, in a case of failure to acquire location information at a time of image capturing by the image capturing unit, a range of locations predictable at the time of image capturing based on the location information acquired by the location information acquiring unit earlier than the time of image capturing;

a display control unit that displays a predictable range of locations on a display unit based on the location information acquired earlier than the time of image capturing and the range of locations at the time of image capturing predicted by the location prediction unit;

a designation reception unit that receives a location designated by a user from within the predictable range of locations displayed on the display unit by the display control unit; and a captured location setting unit that sets location information of the location received by the designation reception unit as the location information at the time of image capturing. In order to attain the above-described object, in accordance with a second aspect of the present invention, there is provided an image capturing method carried out by an image capturing apparatus that includes a location information acquiring unit that measures a current location and acquires location information and an image capturing unit that captures an image of a subject and outputs image data acquired as a result thereof; the image capturing method comprising:

a storage control step of storing the location information acquired by the location information acquiring unit at a time of image capturing by the image capturing unit in a predetermined storage area, in association with image data outputted from the image capturing unit;

a location prediction step of predicting, in a case of failure to acquire location information at a time of image capturing by the image capturing unit, a range of locations at the time of image capturing based on the location information acquired by the location information acquiring unit earlier than the time of image capturing;

a display control step of displaying a predictable range of locations on a display unit based on the location information acquired earlier than the time of image capturing and the range of locations at the time of image capturing predicted in the location prediction step;

a designation reception step of receiving a location designated by a user from within the predictable range of locations displayed on the display unit in the display control step; and a captured location setting step of setting location information of the location received in the designation reception step as the location information at the time of image capturing. In order to attain the above-described object, in accordance with a third aspect of the present invention, there is provided a storage medium having stored therein a program causing a computer that controls an image capturing apparatus including a location information acquiring unit that acquires location information of a current location and an image capturing unit that captures an image of a subject and outputs image data acquired as a result thereof, to function as:

a storage control function that stores the location information acquired by the location information acquiring unit at a time of image capturing by the image capturing unit in a predetermined storage area, in association with the image data outputted from the image capturing unit;

a location prediction function that predicts, in a case of failure to acquire location information at a time of image capturing by the image capturing unit, a range of locations at the time of image capturing based on the location information acquired by the location information acquiring unit earlier than the time of image capturing;

a display control function that displays a predictable range of locations on a display unit based on the location information acquired earlier than the time of image capturing and the range of locations at the time of image capturing predicted by the location prediction function;

a designation reception function that receives a location designated by a user from within the predictable range of locations displayed on the display unit by the display control function; and a captured location setting function that sets location information of the location received by the designation reception function as the location information at the time of image capturing.

BRIEF DESCRIPTION OF THE DRAWINGS

FIG. 3 is a structural example of a table (storage area) to register (store) movement states of a user and detection conditions thereof from a nonvolatile database memory;

FIG. 4 is a flowchart showing flow of the location information storing processing.

DETAILED DESCRIPTION OF THE INVENTION

The following describes an embodiment of the present invention with reference to the drawings.

Figure 1:
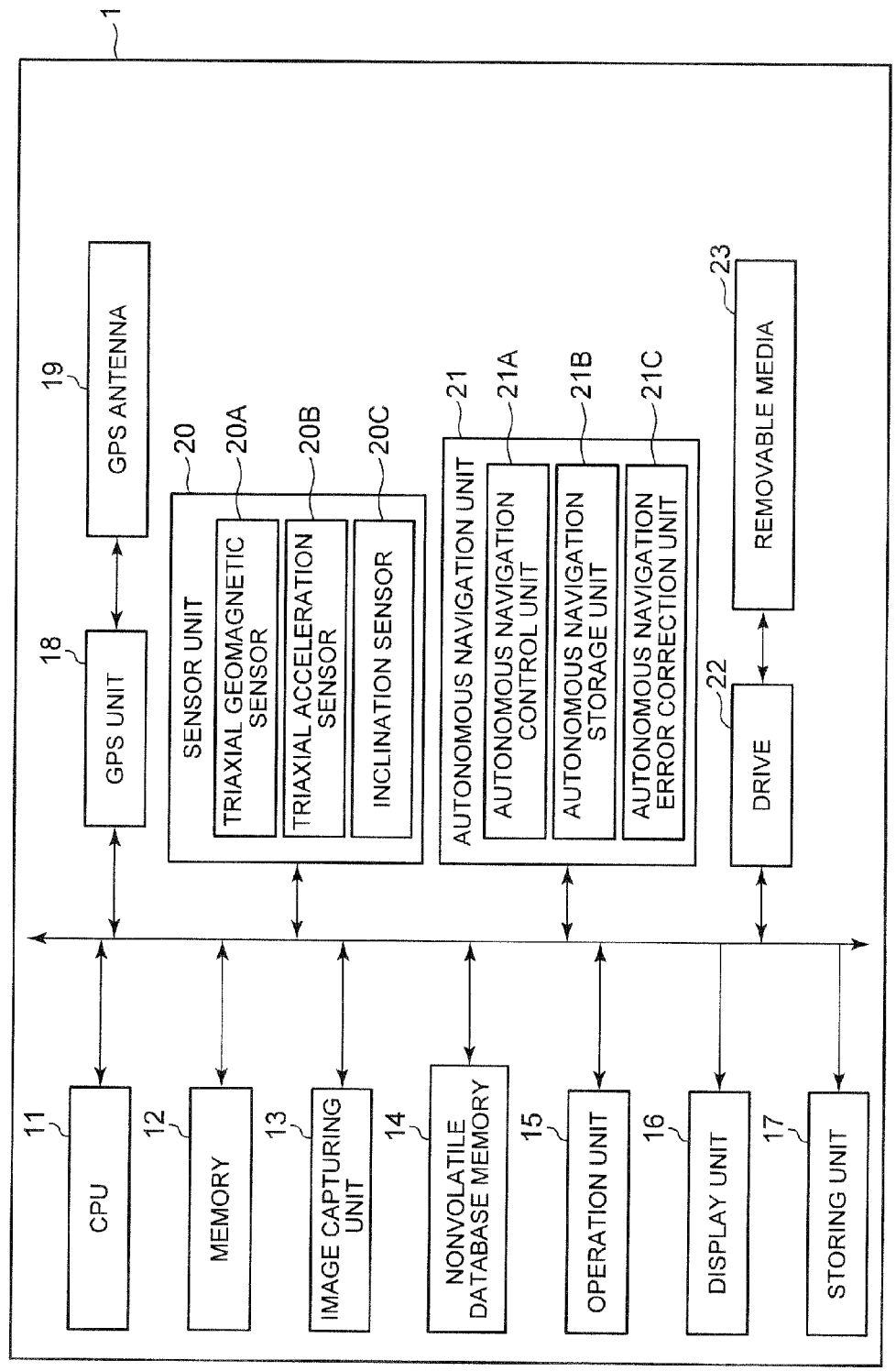
FIG. 1 is a block diagram showing a hardware configuration of an image capturing apparatus according to one embodiment of the present invention.

FIG. 1 is a block diagram showing a hardware configuration of an image capturing apparatus according to one embodiment of the present invention.

The image capturing apparatus can be configured by a digital camera 1 having a GPS function, for example.

The digital camera 1 is provided with a CPU (Central Processing Unit) 11, a memory 12, an image capturing unit 13, a nonvolatile database memory 14, an operation unit 15, a display unit 16, a storing unit 17, a GPS unit 18, a GPS antenna 19, a sensor unit 20, an autonomous navigation unit 21, and a drive 22.

The CPU 11 executes various processes including location information storing processing, which will be described later, in accordance with programs that are stored in the memory 12.

The memory 12 is constituted by a ROM (Read Only Memory), a RAM (Random Access Memory), a DRAM (Dynamic Random Access Memory), and the like, for example.

The ROM stores programs and the like necessary for the CPU 11 to execute various processes.

The RAM stores data and the like necessary for the CPU 11 to execute the various processes as appropriate.

Furthermore, the DRAM temporarily stores audio data, image data outputted from the image capturing unit 13, which will be described later, and the like.

Also, the DRAM stores various kinds of data necessary for various kinds of audio processing and image processing.

Furthermore, the DRAM includes a display memory area to store and read image data for displaying the image.

The image capturing unit 13 is provided with an optical lens unit and an image sensor.

The optical lens unit is configured by a lens that condenses light to photograph a subject included within a predetermined angle of view.

The lens is configured by a focus lens, a zoom lens, or the like, for example.

The focus lens causes the optical lens unit to form an image of a subject on the light receiving surface of the image sensor.

The zoom lens freely changes a focal point of the optical lens unit within a predetermined range.

The optical lens unit includes peripheral circuits to adjust parameters such as focus, exposure, white balance, and the like as necessary.

The image sensor is configured by an optoelectronic conversion device, an AFE (Analog Front End), and the like, for example.

The optoelectronic conversion device is configured by a CMOS (Complementary Metal Oxide Semiconductor) type optoelectronic conversion device, and/or the like, for example.

An image of a subject from the optical lens unit via a shutter unit (not shown) is incident on the optoelectronic conversion device.

The optoelectronic conversion device optoelectronically converts (i.e. captures) an image of a subject as an image signal at a predetermined interval, accumulates the image signal thus converted, and sequentially supplies the image signal thus accumulated to the AFE as an analog signal.

The AFE executes various kinds of signal processing such as A/D (Analog/Digital) conversion on the analog image signal.

As a result of the various kinds of signal processing, a digital signal is generated and outputted as an output signal from the image sensor.

Hereinafter, the digital signal of the image signal is referred to as "image data".

In this way, the image data is finally outputted from the image capturing unit 13 and stored in the memory 12.

The nonvolatile database memory 14 stores various kinds of data accumulated as a database.

For example, in the present embodiment, the nonvolatile database memory 14 stores a plurality of items of map data having map information and location information in association with metadata including location information.

The operation unit 15 is configured by various buttons and keys such as a shutter key, a power button, a zoom key, a mode switching key, and the like.

When a user presses and operates any one of the various buttons and keys, an operation signal corresponding to the button or the key thus pressed and operated is generated and supplied to the CPU 11.

The display unit 16 is configured by an LCD (Liquid Crystal Display) device, for example, and displays various images.

For example, in the present embodiment, the display unit 16 displays a map including the current location of the digital camera 1 or a map of the vicinity thereof.

The storing unit 17 is constituted by a DRAM or the like.

The storing unit 17 stores image data outputted from the image capturing unit 13.

The GPS unit 18 receives GPS signals from a plurality of GPS satellites via the GPS antenna 19.

Based on the GPS signals thus received, the GPS unit 18 calculates latitude, longitude, altitude, and the like as location information indicative of the current location of the digital camera 1.

The sensor unit 20 is provided with a triaxial geomagnetic sensor 20A, a triaxial acceleration sensor 20B, and an inclination sensor 20C.

The triaxial geomagnetic sensor 20A includes an MI (Magneto-Impedance) element whose impedance changes in accordance with the ambient magnetic field fluctuation, for example.

The triaxial geomagnetic sensor 20A detects the triaxial (X, Y, Z) components of the geomagnetic field by way of the MI element, and outputs the detection data.

Hereinafter, the detection data of the triaxial geomagnetic sensor 20A is referred to as "triaxial geomagnetic data"

The triaxial acceleration sensor 20B includes a piezoresistive type or electrostatic capacity type detection mechanism.

By way of the detection mechanism, the triaxial acceleration sensor 20B detects the triaxial (X, Y, Z) components of the acceleration of a user holding the digital camera 1, and outputs the detection data thereof.

Hereinafter, the detection data of the triaxial acceleration sensor 20B is referred to as "triaxial acceleration data".

From among the components of the triaxial acceleration data, the X-axial component corresponds to the component in a gravity acceleration direction (vertical component).

The Y-axial component corresponds to the component in a direction perpendicular to an advancing direction of a user (lateral component) in a horizontal plane perpendicular to the gravity acceleration direction.

The Z-axial component corresponds to the component in an advancing direction of the user (advancing component) in the horizontal plane perpendicular to the gravity acceleration direction.

Even in a state of an arbitrary attitude (inclination), the triaxial acceleration sensor 20B can output the triaxial acceleration data that is corrected in accordance with the inclination.

Therefore, the CPU 11 corrects data outputted from sensor types that have movable mechanisms, specifically the inclination sensor 20C and/or the like that uses a gyro sensor, in accordance with data outputted from the triaxial acceleration sensor 20B, which has been corrected in accordance with the inclination.

With this, it becomes possible for the CPU 11 to accurately acquire various kinds of data to execute positioning calculation even in a moving state in which the digital camera 1 is subject to an external force such as centrifugal force, e.g., in a case of capturing an image of a subject when traveling on a train, a vehicle, or the like.

The inclination sensor 20C includes, for example, an angular velocity sensor such as a piezoelectric oscillation gyro that outputs a voltage value in accordance with the applied angular velocity.

The detection result of the inclination sensor 20C does not immediately indicate the inclination of the digital camera 1, but the CPU 11 calculates the amount of change in inclination of the digital camera 1 based on the detection result (a voltage value indicating angular velocity) of the inclination sensor 20C.

More specifically, the CPU 11 integrates voltage values sequentially outputted from the inclination sensor 20C, and thereby generates inclination change data indicative of the amount of change in inclination.

Since the CPU 11 corrects the detection result of the inclination sensor 20C based on the detection result of the triaxial acceleration sensor 20B, orientation can be measured even in a moving state subject to an external force such as centrifugal force.

The autonomous navigation unit 21 outputs auxiliary information (hereinafter, referred to as "positioning auxiliary information") necessary for the CPU 11 to calculate the location information by way of compensation when the location information outputted from the GPS unit 18 is lost or when the GPS unit 18 is driven so that it intermittently outputs the location information.

In order to output the positioning auxiliary information, the autonomous navigation unit 21 includes an autonomous navigation control unit 21A, an autonomous navigation storage unit 21B, and an autonomous navigation error correction unit 21C.

The autonomous navigation control unit 21A calculates the orientation (hereinafter, referred to as "moving orientation") of the advancing direction of the user holding the digital camera 1, based on the triaxial geomagnetic data outputted from the triaxial geomagnetic sensor 20A and the triaxial acceleration sensor 20B.

Furthermore, the autonomous navigation control unit 21A calculates a moving distance moved by the user holding the digital camera 1, by integrating the advancing component of the triaxial acceleration data sequentially outputted from the triaxial acceleration sensor 20B.

Here, the moving distance is intended to mean the distance from a predetermined starting location to the current location of the user holding the digital camera 1.

The predetermined starting location is intended to mean a location when the autonomous navigation control unit 21A starts the integration.

This means that the predetermined starting location is intended to mean the location of the user holding the digital camera 1 at the time when the integration value is set to 0 in the initial setting or when the integration value is reset to 0 thereafter.

The autonomous navigation control unit 21A supplies to the CPU 11 the information indicative of the moving orientation and the moving distance thus calculated, as the positioning auxiliary information.

The CPU 11 calculates location information such as latitude, longitude, and altitude based on the positioning auxiliary information.

The autonomous navigation control unit 21A corrects the positioning auxiliary information based on correction information supplied from the autonomous navigation error correction unit 21C, which will be described later.

In order to generate the correction information, it is necessary to keep a history of the positioning auxiliary information corresponding to the location information from the GPS unit 18.

Therefore, the autonomous navigation control unit 21A outputs the positioning auxiliary information as needed, regardless of whether or not the GPS unit 18 outputs the location information.

The autonomous navigation storage unit 21B stores as appropriate the calculation result of the autonomous navigation unit 21, information necessary for the calculation, and the like.

For example, the autonomous navigation storage unit 21B stores positioning auxiliary information, i.e., the moving orientation and the moving distance of the user holding the digital camera 1, outputted from the autonomous navigation control unit 21A.

The autonomous navigation error correction unit 21C generates information (hereinafter, referred to as "correction information") to correct the error of the positioning auxiliary information (the moving orientation and the moving distance of the user holding the digital camera 1), derived from the detection result of the sensor unit 20.

The autonomous navigation error correction unit 21C supplies the correction information thus generated to the autonomous navigation control unit 21A.

Here, the autonomous navigation control unit 21A corrects the positioning auxiliary information using the correction information.

With this, it is possible to acquire positioning auxiliary information in which the error derived from the detection result of the sensor unit 20 has been reduced.

For example, the detection result of the sensor unit 20 is sensitive to temperature change.

Consequently, the positioning auxiliary information may have an error derived from the detection result of the sensor unit 20 subject to the temperature change.

The autonomous navigation error correction unit 21C continually calculates respective differences between the moving orientations and the moving distance calculated as the positioning auxiliary information by the autonomous navigation control unit 21A, and the moving orientation and the moving distance specified by way of the location information outputted from the GPS unit 18.

More specifically, the difference between the moving orientations and the ratio between the moving distances are calculated as the correction information.

The autonomous navigation error correction unit 21C stores, as correction information in the autonomous navigation storage unit 21B, data thus acquired (hereinafter, referred to as "difference data") indicative of the calculation result, in association with temperature at the time when the difference data was acquired and temperature change amount.

When calculating the moving orientation and the moving distance, the autonomous navigation control unit 21A acquires as correction information the difference data corresponding to the temperature at the time, from the autonomous navigation storage unit 21B.

Using the correction information, the autonomous navigation control unit 21A corrects the positioning auxiliary information.

With this, it is possible to acquire positioning auxiliary information in which the error derived from the detection result of the sensor unit 20 has been reduced.

Removable media 23 such as a magnetic disk, an optical disk, a magneto-optical disk, or a semiconductor memory is mounted as appropriate to the drive 22.

Programs read by the drive 22 from the removable media 23 are installed in the memory 12, the nonvolatile database memory 14, or the like, as needed.

The removable media 23 can store therein data of a plurality of maps in association with metadata in place of the nonvolatile database memory 14.

The removable media 23 can similarly store various kinds of data such as image data stored in the memory 12 and the like.

The digital camera 1 having such a configuration can carry out the following series of processes.

The digital camera 1 attempts to repeatedly and sequentially acquire the location information indicative of the current location from the GPS unit 18 at a predetermined time interval.

The digital camera 1 captures an image of a subject when a user operates the operation unit 15, e.g., presses and operates a shutter button (not shown), to instruct to start capturing and recording.

The digital camera 1 acquires image data (hereinafter, referred to as "image data of a captured image") as a result thereof.

If location information at the time of image capturing has been successfully acquired from the GPS unit 18, the digital camera 1 stores, in the removable media 23 or the like, the location information from the GPS unit 18 in association with the image data of the captured image.

On the other hand, if location information could not be acquired at the time of image capturing from the GPS unit 18, the digital camera 1 causes the display unit 16 to display a map including a location identified based on location information, which has been acquired from the GPS unit 18 prior to the image capturing, or a map of the vicinity thereof.

By operating the operation unit 15, the user can designate a desired location to be stored in association with the image data from within the map displayed on the display unit 16.

The digital camera 1 receives the location designated by the user operation of the operation unit 15.

The digital camera 1 then stores, in the removable media 23 or the like, the location information indicative of the received location in association with the image data of the captured image.

Hereinafter, such a series of processing is referred to as "location information storing processing".

Figure 2:
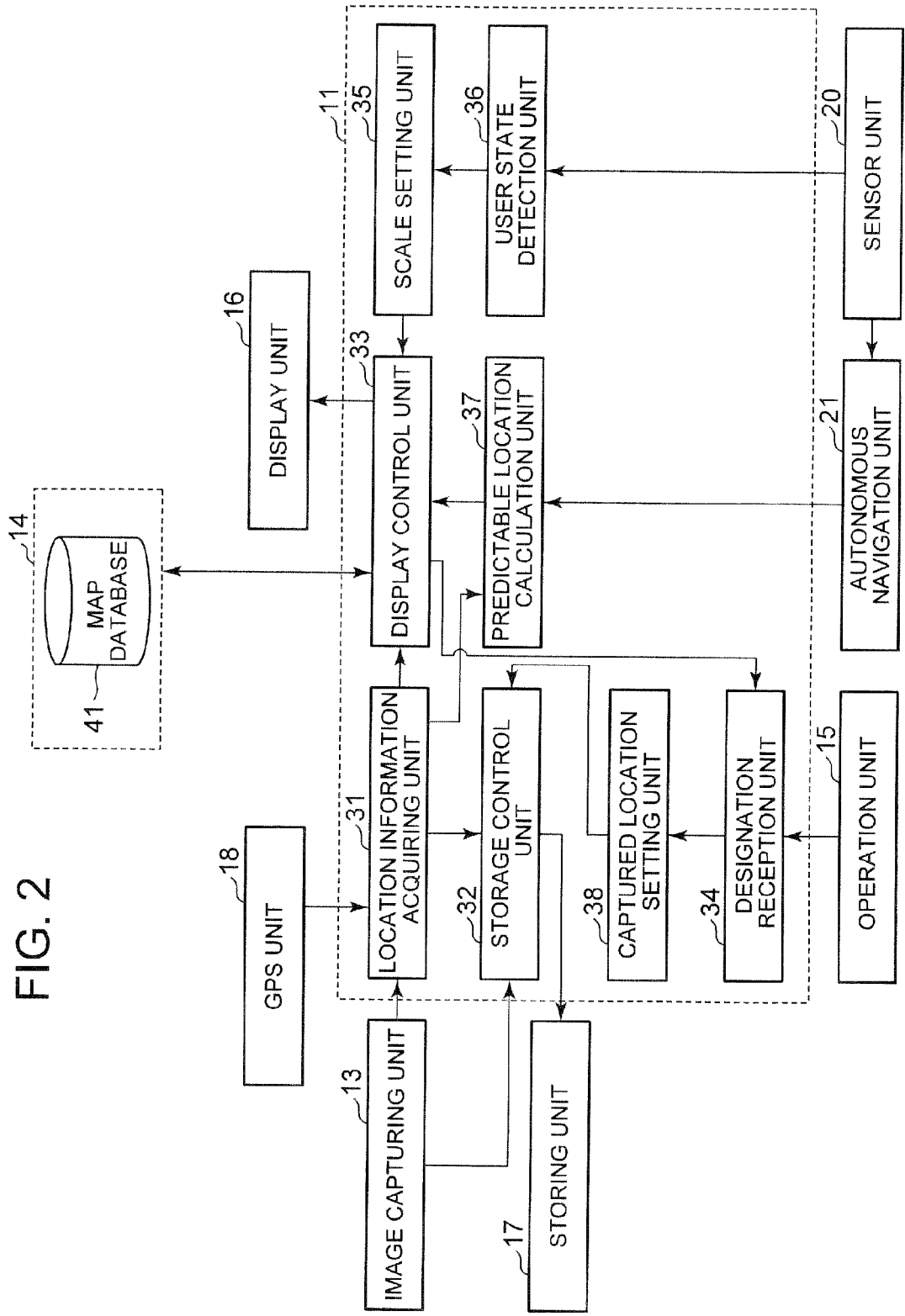
FIG. 2 is a functional block diagram showing a functional configuration of the image capturing apparatus shown in FIG. 1 to carry out location information storing processing.

FIG. 2 is a functional block diagram showing a functional configuration of the digital camera 1 to carry out the location information storing processing.

FIG. 2 illustrates, from among the constituent elements of the digital camera 1 shown in FIG. 1, only the CPU 11, the image capturing unit 13, the nonvolatile database memory 14, the operation unit 15, the display unit 16, the storing unit 17, the GPS unit 18, the sensor unit 20, and the autonomous navigation unit 21.

The CPU 11 includes a location information acquiring unit 31, a storage control unit 32, a display control unit 33, a designation reception unit 34, a scale setting unit 35, a user state detection unit 36, a predictable location calculation unit 37, and a captured location setting unit 38.

The nonvolatile database memory 14 includes a map database 41.

The location information acquiring unit 31 repeats an attempt of acquiring location information (hereinafter, referred to as "GPS location information") of the current location from the GPS unit 18 at a predetermined time interval.

If the GPS location information has been successfully acquired, the location information acquiring unit 31 supplies the GPS location information to the storage control unit 32.

In the present embodiment, it is assumed that the location information acquiring unit 31 stores in the storing unit 17 a plurality of instances of the acquired GPS location information.

On the other hand, if GPS location information could not be acquired, the location information acquiring unit 31 supplies to the display control unit 33 and the predictable location calculation unit 37 the GPS location information, which has already been acquired before image capturing, along with a signal (hereinafter, referred to as an "error signal") that indicates that the acquisition of location information has failed.

Here, although the GPS location information supplied to the display control unit 33 is not limited as long as it has been acquired before image capturing, it is preferable to employ GPS location information indicative of a location close to the location of the digital camera 1 at the time of image capturing.

This is because a map for the user to designate a location at the time of image capturing is displayed based on such GPS location information.

Therefore, in the present embodiment, it is assumed that the last instance of the GPS location information (hereinafter, referred to as "last GPS location information") that has been lastly acquired from among the instances of the GPS location information acquired before capturing is supplied to the display control unit 33.

Also, in the present embodiment, it is assumed that the location information acquiring unit 31 determines that the time when a capture start signal is sent from the image capturing unit 13 (or the CPU 11) is the time of image capturing.

The capture start signal is intended to mean a signal sent out from the image capturing unit 13 (or the CPU 11) when a user operates the operation unit 15, e.g., presses and operates the shutter button (not shown).

The storage control unit 32 basically executes control to cause the storing unit 17 to store the GPS location information acquired by the location information acquiring unit 31 at the time of image capturing by the image capturing unit 13 in association with image data of a captured image outputted from the image capturing unit 13.

More specifically, for example, image data of a captured image is contained in a predetermined EXIF (Exchangeable Image File Format) file.

Hereinafter, such a file containing image data of a captured image is referred to as a "captured image file".

The captured image file can contain, as well as image data of a captured image, various kinds of meta information on the captured image.

In the present embodiment, location information at the time of image capturing, more specifically, information indicative of latitude, longitude, and altitude at the time of image capturing, is contained as one kind of meta information in the captured image file.

Such a captured image file is stored in the storing unit 17.

However, at the time of image capturing by the image capturing unit 13, the location information acquiring unit 31 may fail to acquire the GPS location information, for example, in a case in which the digital camera 1 is located indoors or the like and unable to receive a signal from a GPS satellite.

In such a case, in place of the GPS location information, information of a location received by the designation reception unit 34, which will be described later, is contained as one kind of meta information in the captured image file.

This means that in a case in which no GPS location information at the time of image capturing is available, the storage control unit 32 executes control to cause the storing unit 17 to store the location information corresponding to the location designated by the user via the designation reception unit 34, which will be described later, in association with the image data of the captured image.

When the location information acquiring unit 31 fails to acquire the GPS location information at the time of image capturing and supplies an error signal, the display control unit 33 executes the following control.

The display control unit 33 executes control to cause the display unit 16 to display a predetermined map based on the last GPS location information supplied along with the error signal from the location information acquiring unit 31 and map information stored in the map database 41, which will be described later.

More specifically, the display control unit 33 acquires map information corresponding to the location specified by the last GPS location information in a scale set by the scale setting unit 35 from among a plurality of items of map information stored in the map database.

The display control unit 33 causes the display unit 16 to display a map including a location specified by last GPS location information, and a range of predicated locations (predictable locations) at the time of image capturing based on the location, or a map of the vicinity thereof.

The display control unit 33 supplies the map information thus acquired also to the designation reception unit 34.

The designation reception unit 34 receives a location designated by a user operating the operation unit 15, from within the map displayed on the display unit 16 based on the map information supplied from the display control unit 33.

As described above, the user can designate a desired location to be recorded in association with the image data of the captured image from within the map displayed on the display unit 16, by operating the operation unit 15.

The designation reception unit 34 generates location information corresponding to the location thus received and supplies it to the storage control unit 32.

In this case, as described above, the location information indicative of the location received by the designation reception unit 34 is stored in the storing unit 17 in association with the image data of the captured image under the control of the storage control unit 32.

The scale setting unit 35 performs a map scale setting in accordance with the user's movement state detected by the user state detection unit 36.

The scale setting unit 35 supplies information of the set map scale to the display control unit 33.

The user state detection unit 36 acquires the component in each direction of the acceleration data outputted from the triaxial acceleration sensor 20B of the sensor unit 20.

The user state detection unit 36 detects the user's movement state using the vibration frequency of the component in each direction of the triaxial acceleration data and the amplitude thereof, for example.

Hereinafter, such a series of processing carried out by the user state detection unit 36 until the user's movement state is detected is referred to as "state detection processing".

For example, in the present embodiment, processing that detects the user's movement state based on a table shown in FIG. 3 is employed as the state detection processing.

FIG. 3 is a structural example of a table (storage area) to register (store) movement states of a user and detection conditions thereof from among storage areas of the nonvolatile database memory 14.

In the present embodiment, as shown in FIG. 3, there are 4 kinds of movement state, i.e., "Stationary", "Walking", "Running", and "Moving on a vehicle" are detectable by the state detection processing.

In the example of FIG. 3, since the table has a matrix structure, hereinafter, a set of items in a horizontal line shown in FIG. 3 is referred to as a "row", and a set of items in a vertical line shown in FIG. 3 is referred to as a "column".

In FIG. 3, #K denotes the row number K.

The K-th row is associated with a predetermined kind of user's movement state.

In the example of FIG. 3, in the "User's movement state" item in the 1st column of the K-th row, the user's movement state corresponding to the K-th row is registered (stored).

In the "Detection conditions" item of the 2nd column of the K-th row, i.e., detection conditions for detecting the user's movement state corresponding to the K-th row (i.e., registered (stored) in the 1st column of the K-th row) is registered (stored).

More specifically, "Stationary" is stored in the 1st column of the 1st row.

In the 2nd column of the 1st row, a condition: "No component was detected in each direction of acceleration by triaxial acceleration sensor 20B (Amplitude of component in each direction is below 0.5G)" is stored.

Accordingly, when the above described condition is satisfied, the user's movement state is recognized as being "Stationary".

Similarly, "Walking" is stored in the 1st column of the 2nd row.

The 2nd column of the 2nd row stores a condition: "Triaxial acceleration sensor 20B has detected vertical component vibration of acceleration having frequency less than or equal to 2 Hz and amplitude greater than or equal to a predetermined value 1.0G".

Accordingly, when the above described condition is satisfied, the user's movement state is recognized as being "Walking".

Similarly, "Running" is stored in the 1st column of the 3rd row.

The 2nd column of the 3rd row stores a condition: "Triaxial acceleration sensor 20B has detected vertical component vibration of acceleration having frequency exceeding 2 Hz and amplitude greater than or equal to a predetermined value 1.0G".

Accordingly, when the above described condition is satisfied, the user's movement state is recognized as being "Running".

Similarly, "Moving on a vehicle" is stored in the 1st column of the 4th row.

The 2nd column of the 4th row stores a condition: "Triaxial acceleration sensor 20B has detected vertical component vibration of acceleration having amplitude below a predetermined value 0.5G and advancing component vibration of acceleration having amplitude greater than or equal to a predetermined value 0.5G".

Accordingly, when the above described condition is satisfied, the user's movement state is recognized as being "Moving on a vehicle".

In this way, the user state detection unit 36 executes the state detection processing using the table shown in FIG. 3.

The user state detection unit 36 supplies to the scale setting unit 35 the user's movement state detected by the state detection processing.

When the location information acquiring unit 31 fails to acquire the GPS location information at the time of image capturing and supplies an error signal, the predictable location calculation unit 37 executes the following control.

The predictable location calculation unit 37 executes control to cause the display unit 16 to display a predetermined map based on the last GPS location information supplied along with the error signal from the location information acquiring unit 31 and map information stored in the map database 41, which will be described later.

More specifically, the predictable location calculation unit 37 measures a relative change in location by way of autonomous navigation based on the output result from the autonomous navigation unit 21.

The predictable location calculation unit 37 predicts a predictable location of a current location based on the relative change in location and the last GPS location information supplied from the location information acquiring unit 31.

After that, the predictable location calculation unit 37 supplies to the display control unit 33 the predictable location thus calculated.

In the present embodiment, the map database 41 contains data of a map indicative of the state of land surface expressed on a plane surface scaled at a predetermined ratio, and information as map information that includes at least location information indicative of the latitude, longitude, and altitude of the map.

It is to be noted that, as the map data format, a vector map format and a raster map format are generally employed. In the present embodiment, however, a description will be given of a case in which the vector map format is employed.

The vector map is intended to mean map data in which data for displaying objects such as roads, facilities, and text characters in a map, and data for displaying other elements of the map are separated from each other in advance.

Also, data for displaying each object in the vector map is constituted by data of a set of directed line segments or vectors, to which property information corresponding to the object regarding road width, size, and the like is attached.

Display processing by way of the vector map is not described in detail since it is a well-known technique.

The display control unit 33 sets a map range based, for example, on the map scale corresponding to the user's movement state.

The display control unit 33 specifies objects to be displayed in accordance with the map range based on the property information indicative of road width and size attached to each road and each facility.

Furthermore, the display control unit 33 acquires from the map database 41 the map information including data of the specified objects to be displayed.

In the following, a description will be given of processing, hereinafter referred to as "the location information storing processing", implemented by the functional configuration of FIG. 2 from among a plurality of kinds of processing carried out by the digital camera 1 with reference to FIG. 4.

FIG. 4 is a flowchart showing flow of the location information storing processing.

For example, in the present embodiment, the location information storing processing starts with a power-on operation by a user operating the operation unit 15.

The following processes are executed.

In step S11 of FIG. 4, the location information acquiring unit 31 attempts to acquire GPS location information from the GPS unit 18.

In this process, if the location information acquiring unit 31 successfully acquires the GPS location information from the GPS unit 18, the location information acquiring unit 31 stores it in the storing unit 17.

It is assumed that a plurality of instances of such GPS location information so far acquired is already stored.

In step S12, the location information acquiring unit 31 determines whether or not the image capturing unit 13 has started capturing.

If no capture start signal has been sent from the image capturing unit 13, a determination of NO is made in step S12, and control goes back to step S12.

The determination process of step S12 is repeated until the image capturing unit 13 starts image capturing, and the location information storing processing enters into a waiting state.

After that, when the image capturing unit 13 starts image capturing and sends a capture start signal, a determination of YES is made in step S12, and control proceeds to step S13.

In step S13, the location information acquiring unit 31 determines whether or not GPS location information has been acquired before starting image capturing.

If the GPS location information has been successfully acquired in the process of step S11, a determination of YES is made in step S13, and control proceeds to the process of step S14.

In step S14, the storage control unit 32 stores the GPS location information acquired in the process of step S11 in association with image data of a captured image outputted from the image capturing unit 13.

When this process is terminated, the location information storing processing ends.

On the other hand, if no GPS location information has been acquired in the process of step S11, a determination of NO is made in step S13, and control proceeds to step S15.

In step S15, the scale setting unit 35 sets a map scale in accordance with the user's movement state detected by the user state detection unit 36.

In this process, in a case in which the user's movement state is "Walking" or "Running", the scale setting unit 35 sets the map scale to "Detailed" appropriate for the user's speed of walking or running.

On the other hand, in a case in which the user's movement state is "Moving on a vehicle" or "Stationary", the scale setting unit 35 sets the map scale to "Normal", which is convenient for grasping the overall area where the user is present.

In this process, since the scale of the map displayed on the display unit 16 changes in accordance with the user's movement state, it is possible to enhance usability for the user regardless of the user's movement state.

In step S16, the display control unit 33 acquires corresponding map information from the map database 41 based on the last GPS location information acquired before the current image capturing, and the map scale set in the process of step S15.

In step S17, the display control unit 33 causes the display unit 16 to display a map based on the map information acquired in the process of step S16.

Figure 5:
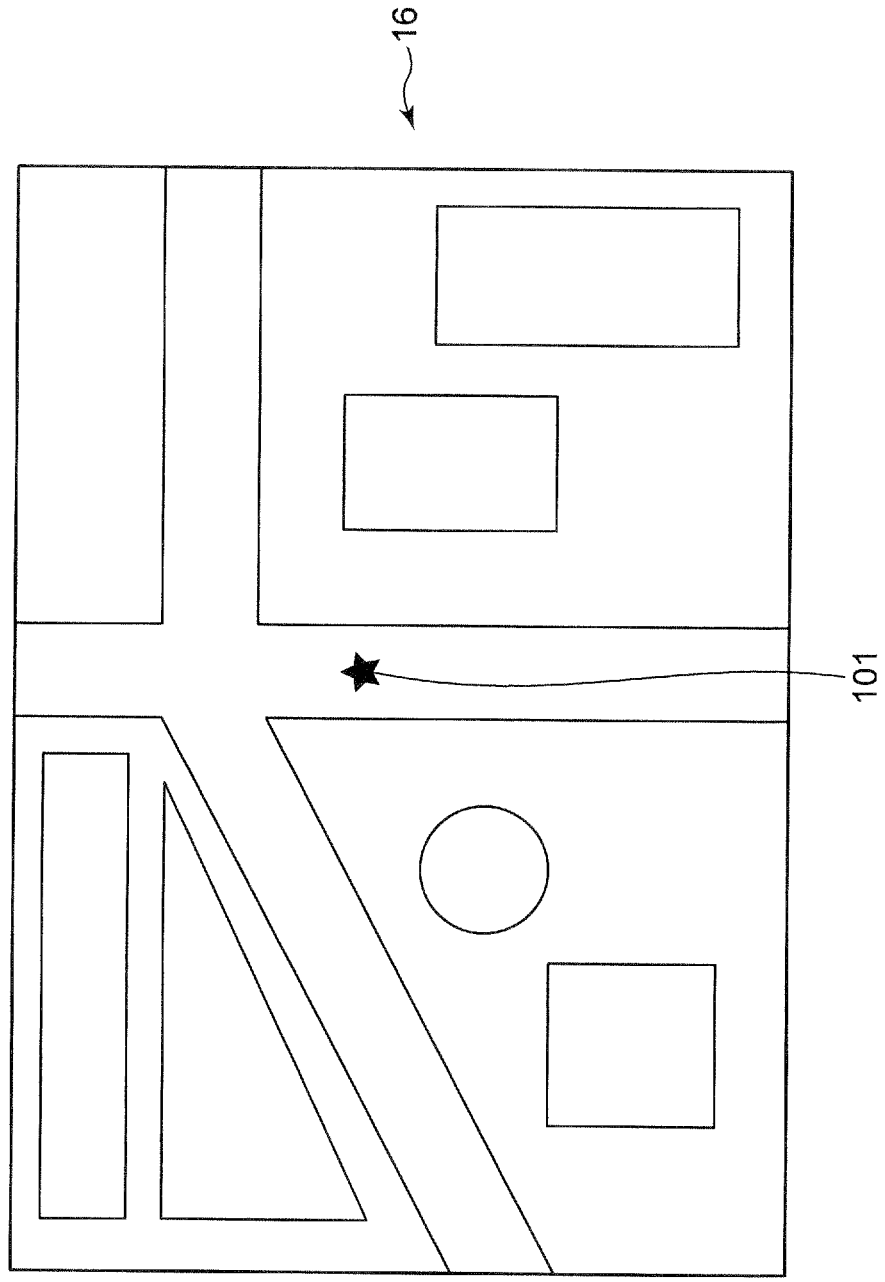
FIG. 5 is a diagram showing one example of a map displayed on a display unit in a case of failure to acquire GPS location information from a GPS unit at the time of image capturing.

With this, in the present embodiment, a map such as shown in FIG. 5 is displayed on the display unit 16.

FIG. 5 shows one example of a map displayed on the display unit 16 in a case in which GPS location information could not be acquired from the GPS unit 18 at the time of image capturing.

In such a case, the display control unit 33 acquires corresponding map information from the map database 41 based on the GPS location information acquired before the time of image capturing and the map scale set in accordance with the user's movement state, and causes the display unit 16 to display a map such as shown in FIG. 5 as the map based on the map information.

In the example of FIG. 5, a location specified by the last GPS location information (i.e., a location that was a current location of the digital camera 1 at the time when the last GPS location information was acquired) is shown as the black star 101 on the map.

Thus, in the process of step S17, a map of the vicinity of a location of the digital camera 1 at the time when the GPS location information was acquired, earlier than the present image capturing, is displayed on the display unit 16.

As a result thereof, it is possible for a user to easily designate a location to be associated with the image data of the captured image by way of operation of the operation unit 15.

In step S18 of FIG. 4, the designation reception unit 34 determines whether or not a location designated by the user operating the operation unit 15 has been received.

In a state in which the user has not designated any location by operating the operation unit 15, a determination of NO is made in step S18, and control goes back to step S18.

This means that the determination process of step S18 is repeated until the user operates the operation unit 15 and designates a location, and the location information storing processing enters into a waiting state for user operation.

After that, when the user operates the operation unit 15 and designates a location, a determination of YES is made in step S18.

In this case, the designation reception unit 34 generates location information corresponding to the designated location.

The captured location setting unit 38 sets the designated and received location information as the location information at the time of image capturing, and supplies it to the storage control unit 32.

With this, control proceeds to step S19.

In step S19, the storage control unit 32 stores the location information at the time of image capturing, which has been received in the process of step S18, in association with the image data of the captured image outputted from the image capturing unit 13.

With this, the location information storing processing ends.

With such processes from steps S16 to S18, even if the GPS location information has not been acquired from the GPS unit 18 at the time of image capturing, it is possible to set a location designated by the user as the location at the time of image capturing and associate it with the image data of the captured image.

As described above, the digital camera 1 of the present embodiment is provided with a location information acquiring unit 31, an image capturing unit 13, a display control unit 33, a designation reception unit 34, a storage control unit 32, and a captured location setting unit 38.

The location information acquiring unit 31 acquires location information of the current location.

The image capturing unit 13 captures an image of a subject and outputs the resultant image data.

In a case in which the location information acquiring unit 31 has failed to acquire location information at the time of image capturing by the image capturing unit 13, the display control unit 33 performs control to display a map based on location information that has been acquired by the location information acquiring unit 31 earlier than the image capturing by the image capturing unit 13.

The designation reception unit 34 receives a location designated by a user from within a map whose display is controlled by the display control unit 33.

The captured location setting unit 38 sets location information of the received location as the location information at the time of image capturing.

In a case in which the location information acquiring unit 31 has successfully acquired location information at the time of image capturing by the image capturing unit 13, the storage control unit 32 performs control to store the location information in association with the image data outputted from the image capturing unit 13.

Thus, even in a location where the GPS unit 18 cannot calculate location information, it is possible to store location information at the time of image capturing in association with the image data at the time of image capturing, by a simple operation in which a user designates his or her own location from within the map automatically displayed on the display unit 16.

The digital camera 1 of the present embodiment further includes a scale setting unit 35.

The scale setting unit 35 sets a scale of the map whose display is controlled by the display control unit 33.

With this, since it is possible to display a map on the display unit 16 in an appropriate display form, it is possible to enhance usability for a user to designate his or her own location.

The digital camera 1 of the present embodiment further includes a user state detection unit 36.

The scale setting unit 35 sets a scale of the map displayed on the display unit 16 in accordance with the user's movement state detected by the user state detection unit 36.

Accordingly, it is possible to detect the user's movement state, such as "Walking" or "Running", and to display a preferable map in accordance the user's moving speed.

This means that, in a case in which the user's movement state is "Walking" or "Running", since the user moves at a slow speed, it can be predicted that the current location is not so distant from the location where the last location information has been acquired, the map scale is set to "Detailed".

With this, the user can easily identify the current location from the detailed information of the vicinity. Accordingly, it is possible to enhance usability for the user.

On the other hand, in a case in which the user's movement state is "Moving on a vehicle" such as a train or a vehicle, since the user moves at a rapid moving speed, it can be predicted that the current location is distant from the location where the last location information has been acquired, the map scale is set to "Normal". With this, the user can easily identify the current location from the map of a range that covers predicable locations predicted to be reached from the location of the last image capturing, and it is possible to enhance usability for the user.

It should be noted that the present invention is not limited to the embodiment described above, and any modifications and improvements thereto within a scope in which an object of the present invention can be realized, are included in the present invention.

For example, in the embodiment described above, it has been described that the autonomous navigation control unit 21A calculates the moving distance of the digital camera 1 by integrating the triaxial acceleration data sequentially outputted from the triaxial acceleration sensor 20B. However, the autonomous navigation control unit 21A may calculate the moving distance by counting the number of steps based on upward and downward changes in acceleration detected from the output of the triaxial acceleration sensor 20B, and multiplying the number of steps by a predetermined step length.

For example, in the embodiment described above, it has been described that the location identified by the last GPS location information is displayed in the vicinity of the center of the map in FIG. 5, as one example of a map displayed on the display unit 16 in a case in which the GPS location information could not be acquired from the GPS unit 18 at the time of image capturing. However, the autonomous navigation control unit 21A may calculate a last moving orientation of the digital camera 1 based on a plurality of items of location information or the triaxial geomagnetic data outputted from the triaxial geomagnetic sensor 20A, so that the location identified by the last GPS location information is displayed in a periphery of the map in a direction opposite to the moving orientation, thereby increasing moving orientation area thereof.

For example, in the embodiment described above, it has been described that the scale setting unit 35 sets a map scale in accordance with the user's movement state detected by the user state detection unit 36. However, this does not limit the present invention, and the map scale may be set in any other manner.

For example, the map scale may be set in accordance with a continuous time duration in which the location information acquiring unit 31 fails to acquire the location information until the point of time when the image capturing by the image capturing unit 13.

In a case of a long duration from when the location information acquiring unit 31 cannot acquire location information up to image capturing by the image capturing unit 13, it is possible to predict that the user holding the digital camera 1 has moved to a distant location.

In such a case, the map scale may be set to "Normal". On the other hand, in a case of a short duration from when the location information acquiring unit 31 could no longer acquire location information up to the image capturing by the image capturing unit 13, it is possible to predict that the user holding the digital camera 1 has not moved so far.

In such a case, the map scale may be set to "Detailed". Furthermore, in the embodiment described above, it has been described that the scale setting unit 35 performs map scale setting in accordance with the user's movement state detected by the user state detection unit 36. However, the map scale setting is not limited thereto.

For example, the map scale may be set in accordance with a moving speed or moving orientation, which has been calculated from a plurality of items of location information acquired in a time series by the location information acquiring unit 31.

In a case in which the plurality of items of location information acquired by the location information acquiring unit 31 are separated from one another, the user's moving speed can be calculated to be high. Accordingly, it is possible to assume that the user holding the digital camera 1 is moving at a high speed.

In such a case, the map scale may be set to "Normal".

On the other hand, in a case in which the plurality of items of location information acquired by the location information acquiring unit 31 are close to one another, the user's moving speed can be calculated to be low. Accordingly, it is possible to assume that the user holding the digital camera 1 is moving at a low speed.

In such a case, the map scale may be set to "Detailed".

Furthermore, in the embodiment described above, it has been described that the display control unit 33 displays a map based on the location information acquired by the location information acquiring unit 31 before image capturing by the image capturing unit 13, in a case where the location information acquiring unit 31 has failed to acquire location information at the time of image capturing by the image capturing unit 13. However, the present invention is not limited to this.

For example, the display control unit 33 may perform control to display a map based on the location information indicative of a predictable location calculated by the predictable location calculation unit 37, when the location information acquiring unit 31 has failed to acquire location information at the time of image capturing by the image capturing unit 13.

Therefore, it is possible to enhance the accuracy of the map displayed on the display unit 16 by identifying the user's location to some extent by way of autonomous navigation that can calculate a current predictable location even in an environment in which no GPS signal can be received.

Furthermore, in the embodiment described above, it has been described that the user state detection unit 36 detects the user's movement state based on the vertical vibration frequency acquired from the triaxial acceleration sensor 20B. However, the method of detecting the user's movement state is not limited thereto.

For example, the user's movement state may be detected based on the intensity of acceleration outputted from the triaxial acceleration sensor 20B.

Furthermore, the operation unit 15 described above is not limited to a specific device. As the operation unit 15, any device such as a touch panel, a mouse, a trackball, or a keyboard may be employed as long as the device can designate a location from within a map displayed on the display unit 16.

Furthermore, it has been described in the embodiment that the image capturing apparatus according to the present invention is configured by the digital camera 1, as an applicable example.

However, the present invention is not limited to this and can be applied to any electronic device that is provided with a display function. The present invention is widely applicable to, for example, a portable personal computer, a portable navigation device, a portable game device, and the like.

The series of processes described above can be executed by hardware and also can be executed by software.

In a case in which the series of processes are to be executed by software, a program configuring the software is installed from a network or a storage medium into a computer or the like.

The computer may be a computer embedded in dedicated hardware.

Alternatively, the computer may be capable of executing various functions by installing various programs, i.e., a general-purpose personal computer, for example.

The storage medium containing the program can be constituted not only by the removable media 23 distributed separately from the device main body for supplying the program to a user, but also can be constituted by a storage medium or the like supplied to the user in a state incorporated in the device main body in advance.

The removable media 23 is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), and the like. The magnetic optical disk is composed of an MD (Mini-Disk) or the like. The storage medium supplied to the user in the state incorporated in the device main body in advance includes the memory 12 storing the program, a hard disk, and the like, for example.

It should be noted that in the present specification the steps describing the program stored in the storage medium include not only the processing executed in a time series following this order, but also processing executed in parallel or individually, which is not necessarily executed in a time series.

What is claimed is:

1. An image capturing apparatus, comprising:
    a location information acquiring unit that measures a current location and acquires location information;
    an image capturing unit that captures an image of a subject and outputs image data acquired as a result of the image capture;
    a storage control unit that stores the location information acquired by the location information acquiring unit at a time of image capturing by the image capturing unit in a predetermined storage area, in association with the image data outputted from the image capturing unit, if the location information is successfully acquired by the location information acquiring unit at the time of image capturing;
    a display control unit that, in a case in which the location information acquiring unit fails to acquire the location information at the time of image capturing, automatically displays on a display unit a map with a map range determined based on location information acquired by the location information acquiring unit at a time earlier than the time of image capturing, wherein a map is not displayed on the display unit in a case in which the location information acquiring unit successfully acquires the location information at the time of image capturing;
    a designation reception unit that receives a location designated by a user from within the map range of the map displayed on the display unit by the display control unit; and
    a captured location setting unit that sets location information of the location received by the designation reception unit as the location information at the time of image capturing, in the case in which the location information acquiring unit fails to acquire the location information at the time of image capturing.

2. The image capturing apparatus as set forth in claim 1, further comprising a location prediction unit that predicts, in the case in which the location information acquiring unit fails to acquire the location information at the time of image capturing, locations predictable at the time of image capturing based on the location information acquired by the location information acquiring unit at the time earlier than the time of image capturing,
    wherein the display control unit displays the map with the map range on the display unit determined based on the location information acquired at the time earlier than the time of image capturing and based on the locations at the time of image capturing predicted by the location prediction unit, and the display control unit sets a display scale so that the map with the map range including the location information acquired by the location information acquiring unit at the time earlier than the time of image capturing by the image capturing unit, and the locations at the time of image capturing predicted by the location prediction unit, are displayed.

3. The image capturing apparatus as set forth in claim 1, wherein the display control unit changes a breadth of the map range in accordance with a continuous time duration in which the location information acquiring unit fails to acquire the location information, until the time of image capturing by the image capturing unit.

4. The image capturing apparatus as set forth in claim 1, wherein the display control unit changes a breadth of the map range in accordance with a moving speed calculated based on a plurality of items of location information acquired in a time series by the location information acquiring unit.

5. The image capturing apparatus as set forth in claim 1, further comprising a location prediction unit that predicts, in the case in which the location information acquiring unit fails to acquire the location information at the time of image capturing by the image capturing unit, locations predictable at the time of image capturing based on the location information acquired by the location information acquiring unit at the time earlier than the time of image capturing,
    wherein the display control unit displays the map with the map range on the display unit determined based on the location information acquired at the time earlier than the time of image capturing and based on the locations at the time of image capturing predicted by the location prediction unit, and
    wherein the location prediction unit predicts the locations in accordance with a moving orientation calculated based on a plurality of items of location information acquired in a time series by the location information acquiring unit.

6. The image capturing apparatus as set forth in claim 1, further comprising a user state detection unit that detects a moving state of the user,
    wherein the display control unit changes a breadth of the map range based on the user's moving state detected by the user state detection unit.

7. The image capturing apparatus as set forth in claim 1, further comprising a location prediction unit that predicts, in the case in which the location information acquiring unit fails to acquire the location information at the time of image capturing by the image capturing unit, locations predictable at the time of image capturing based on the location information acquired by the location information acquiring unit at the time earlier than the time of image capturing, wherein the display control unit displays the map with the map range on the display unit determined based on the location information acquired at the time earlier than the time of image capturing and based on the locations at the time of image capturing predicted by the location prediction unit, and wherein the location prediction unit measures, in the case in which the location information acquiring unit fails to acquire the location information at the time of image capturing by the image capturing unit, a relative change in location by way of an autonomous navigation, and predicts a location based on the relative change in location and the location information acquired by the location information acquiring unit at the time earlier than the time of image capturing.

8. An image capturing method carried out by an image capturing apparatus that includes a location information acquiring unit that measures a current location and acquires location information and an image capturing unit that captures an image of a subject and outputs image data acquired as a result of the image capture, the image capturing method comprising:

storing the location information acquired by the location information acquiring unit at a time of image capturing by the image capturing unit in a predetermined storage area, in association with the image data outputted from the image capturing unit, if the location information is successfully acquired by the location information acquiring unit at the time of image capturing;

in a case in which the location information acquiring unit fails to acquire the location information at the time of image capturing, automatically displaying on a display unit a map with a map range which is determined based on location information acquired by the location information acquiring unit at a time earlier than the time of image capturing, wherein a map is not displayed on the display unit in a case in which the location information acquiring unit successfully acquires the location information at the time of image capturing;

receiving a location designated by a user from within the map range of the map displayed on the display unit; and setting location information of the location designated by the user as the location information at the time of image capturing in the case in which the location information acquiring unit fails to acquire the location information at the time of image capturing.

9. A non-transitory computer-readable storage medium having stored thereon a program causing a computer that controls an image capturing apparatus including a location information acquiring unit that acquires location information of a current location and an image capturing unit that captures an image of a subject and outputs image data acquired as a result of the image capture, to perform functions comprising:

storing the location information acquired by the location information acquiring unit at a time of image capturing by the image capturing unit in a predetermined storage area, in association with the image data outputted from the image capturing unit, if the location information is successfully acquired by the location information acquiring unit at the time of image capturing;

in a case in which the location information acquiring unit fails to acquire the location information at the time of image capturing, automatically displaying on a display unit a map with a map range which is determined based on location information acquired by the location information acquiring unit at a time earlier than the time of image capturing, wherein a map is not displayed on the display unit in a case in which the location information acquiring unit successfully acquires the location information at the time of image capturing;

receiving a location designated by a user from within the map range of the map displayed on the display unit; and setting location information of the location designated by the user as the location information at the time of image capturing in the case in which the location information acquiring unit fails to acquire the location information at the time of image capturing.

* * * * *